United States Patent Office

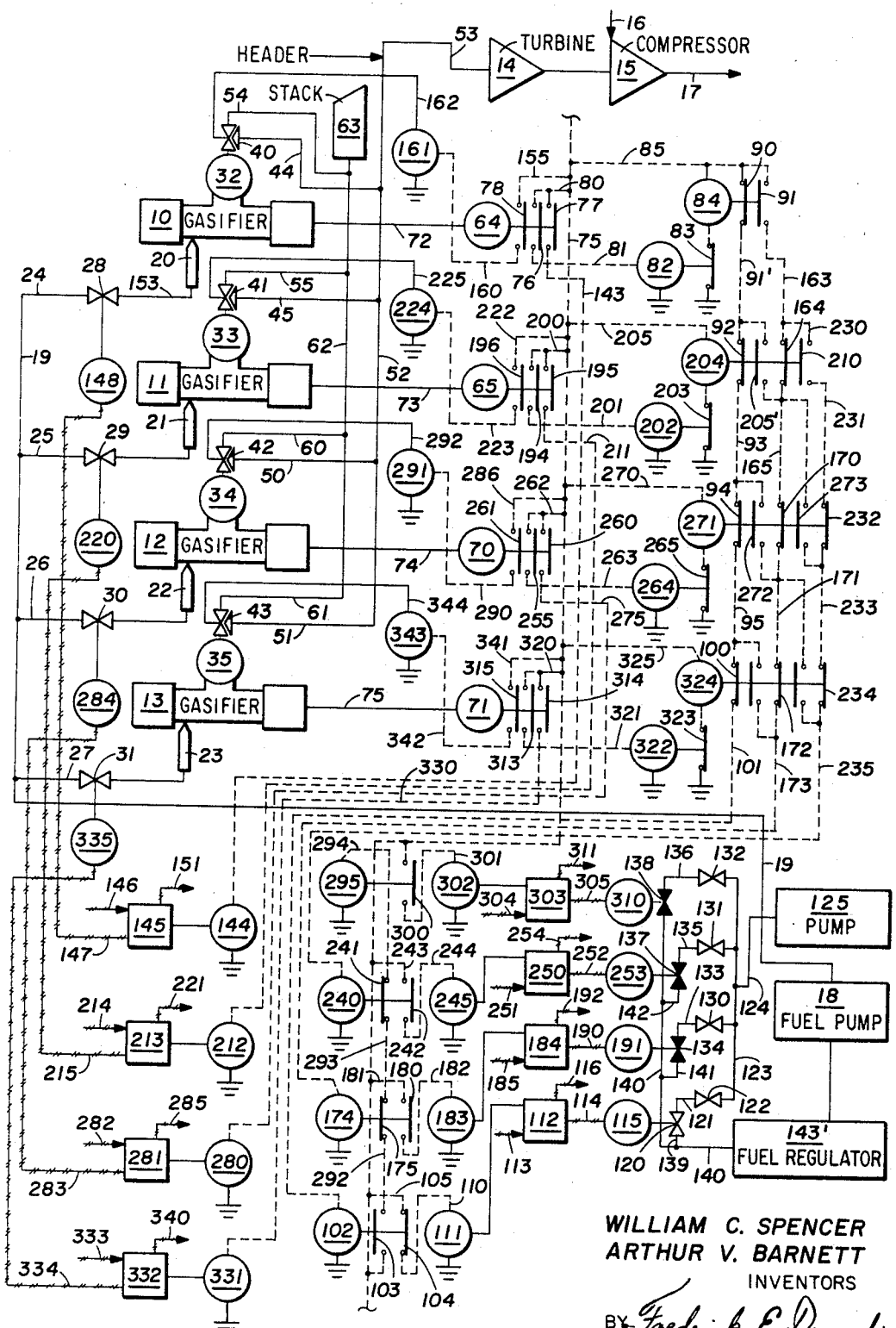

3,405,519
Patented Oct. 15, 1968

3,405,519
METHOD AND SYSTEM FOR OPERATION OF A POWERPLANT
William C. Spencer and Arthur V. Barnett, Bakersfield, Calif., assignors to Mobil Oil Corporation, a corporation of New York
Filed Aug. 18, 1966, Ser. No. 573,383
9 Claims. (Cl. 60—13)

ABSTRACT OF THE DISCLOSURE

This specification discloses a method and system for operation of a powerplant having a plurality of power generators supplying a heated gas under pressure. Upon stoppage of any one of the power generators, the fuel supply to the remaining power generators is increased to increase their power output. Upon stoppage, a signal is created which operates a switch. The switch, in turn, operates valves to increase the output of a fuel pump supplying fuel to the generators. Simultaneously, the supply of fuel to the generator which stopped is discontinued. Additionally, in response to the signal, the gas from the generators remaining in operation is prevented from flowing back to the generator which has stopped.

---

This invention relates to power generation plants and relates more particularly to a method and system for operation of a powerplant having a plurality of power generators to maintain within limits the power output of the plant in the event of failure of one or more of the power generators.

In many instances, powerplants, in order to provide for flexibility and economy in the face of a fluctuating power requirement, operate with a number of individual power generators. Ordinarily, unless the power requirement of the plant necessitates operation of the individual power generators at full capacity, the individual power generators are operated at less than full capacity. One of the main reasons for operating each individual power generator at less than full capacity is the difficulty encountered upon a stoppage, particularly an unintentional stoppage, caused by misfunction, or otherwise, of one or more of the individual generators. With stoppage of one or more of the individual generators, and with the individual generators operating at full capacity, the powerplant is no longer able to meet the power requirement. Thus, it is necessary, in order to meet the power requirement, to start one or more of the remaining generators which involves a delay, which can often be serious. On the other hand, when operating the individual power generators at less than full capacity, upon stoppage of an individual generator, the output of the remaining generators can be increased in order to meet the power requirement of the plant.

Manual control of the individual power generators to increase their power output can be effected. However, such manual control is expensive since it requires the presence of operating personnel in the plant throughout the entire time the plant is operating. Further, manual operation may not be sufficiently rapid to respond to a generator stoppage particularly if two or more generators stop simultaneously or within a short time of each other.

For the operation of a powerplant having a number of individual power generators, it is desirable to increase rapidly, in the event of stoppage of one or more of the power generators, the power output of the power generators remaining in operation.

More particularly, in the operation of a powerplant producing hot gas under pressure from a plurality of free piston engines, it is desirable to maintain, within the limits of the capacity of the free piston engines, the power output of the plant when one or more of the engines stop. The power output of the plant, i.e., the hot gas under pressure, may be, for example, employed to operate an expander turbine which in turn operates an air compressor providing compressed air, which compressed air may be required for a specific purpose. Because of misfunction, or for other reasons, one or more of the engines may discontinue operation. However, the output of hot gas under pressure is desirably maintained at its former level to operate the turbine and thus the air compressor at their former levels. Of course, the output of the plant can be maintained at its former level only if the number of free piston engines remaining in operation can provide the required output. With the discontinuance of operation of one or more of the engines, the other engines are operated at a higher rate to increase their output.

It is an object of this invention to provide a method and apparatus for maintaining, within limits, the output of a powerplant operating with a plurality of individual power generators at a substantially constant level in the event of a discontinuance in operation of one or more of the generators.

This and other objects of the invention will become apparent from the following detailed description.

In accordance with the invention, there are provided a method and apparatus for increasing the rate at which fuel is supplied to a power generator or plurality of power generators remaining in operation after the discontinuance of operation of one or more of the power generators in a plant. In a more specific aspect, there is also provided a method and system for discontinuing the supply of fuel to the power generator of generators which have discontinued operation. In a further more specific aspect, there is also provided a method and system for preventing any backflow of power from the power generator or generators remaining in operation to the generator which has discontinued operation.

The invention involves method and apparatus for, first, the detection of a pressure drop occurring upon stoppage of a power generator supplying heated gas under pressure. In response to the pressure drop, the supply of fuel to the power generator is discontinued. Simultaneously therewith, the rate of supply of fuel to the remaining generator or generators is increased to increase the power output of these generators. Also simultaneously therewith, the heated gas under pressure from the generators remaining in operation is prevented from flowing back to the power generator which has discontinued operation.

The single figure is a schematic representation of a particular embodiment of the invention.

Referring to the figure, there is illustrated a powerplant producing compressed air. The compressed air comes from an air compressor which is operated by an expander turbine. The expander turbine is operated by hot gas under pressure and this gas is provided by a plurality of gasifiers.

Gasifiers 10, 11, 12, and 13 are shown and they provide the heated gas under pressure for operation of expander turbine 14. The expander turbine, in turn, provides mechanical power for the operation of air compressor 15. The air to be compressed enters the compressor 15 through line 16 and the compressed air leaves the compressor through line 17 for utilization as desired. Whereas four gasifiers are illustrated, it will be understood that the plant may be operated by any greater number, or any lesser number greater than one, of gasifiers.

The gasifiers are free piston engines. Free piston engines are well known and are disclosed in Business Week, Apr. 25, 1953, pages 101 and 102; World Oil, July 1965; U.S. Patent No. 2,478,375; and elsewhere. Stated generally, a free piston engine utilizes a two-stroke cycle to generate hot pressured gases which can be transformed into mechanical power by an expander turbine. The free piston engine uses two horizontally opposed pistons operating in a common power cylinder within the engine casing. The fuel for the engine is injected by means of fuel injector into the power cylinder and upon ignition of the fuel, the two horizontally opposed pistons move outwardly from each other within the power cylinder. The fuel may be diesel oil, crude oil, or other fluid material capable of combustion. The power output of the free piston engine depends upon the rate at which the fuel is supplied to it. The power output is not linearly proportional to the rate of fuel supply. Rather, with each unit increase in power output, the amount of fuel required for each increase is greater than that required for the previous increases. Each of the two horizontally opposed pistons within the engine is rigidly connected with a compressor piston operating within air cushions. The air cushions absorb the energy from the compressor pistons as they move outward. When sufficient pressure has been built up in the air cushions to stop the pistons, the air cushions begin to expand, driving the pressure pistons inward for the next cycle. Movement of the pistons forces the gases produced by combustion of the fuel from the engine.

Fuel to the gasifiers is supplied through header 19 by means of fuel pump 18 connected to a source of fuel (not shown). Gasifiers 10, 11, 12, and 13 are provided with fuel injectors 20, 21, 22, and 23, respectively, and the fuel passes from the header to the injectors through lines 24, 25, 26, and 27. The lines 24, 25, 26, and 27 are provided with valves 28, 29, 30, and 31, respectively.

The hot pressured gases leave each of gasifiers 10–13 and enter exhaust gas receivers 32, 33, 34, and 35, respectively. The gases then pass through exhaust control valves 40, 41, 42, and 43, respectively, through lines 44, 45, 50, and 51, respectively, to header 52. From the header the gases pass through line 53 to the expander turbine 14. Connected to each of valves 40, 41, 42, and 43 are lines 54, 55, 60, and 61, respectively, leading to exhaust header 62 which in turn leads to exhaust stack 63.

In the method and system illustrated in the figure, in the event any one of the four gasifiers discontinues operation, the fuel supply to the gasifiers remaining in operation is increased to operate the remaining gasifiers at a sufficiently high rate to provide the same amount of hot compressed gas as was previously provided by the four gasifiers. In the event another gasifier discontinues operation, while the first gasifier is still not operating, or if two of the four gasifiers simultaneously discontinue operation, the fuel supply to the two gasifiers remaining in operation is increased to operate these gasifiers to supply the same amount of hot compressed gas as was previously supplied by the four gasifiers. Similarly, in the event still another gasifier discontinues operation, or if three gasifiers discontinue operation simultaneously, the fuel supply to the gasifier remaining in operation is increased to operate this gasifier to supply the same amount of hot compressed gas as was previously supplied by the four gasifiers. In each of these instances, it is assumed that the original output of hot compressed gas is within the capacity of the generator or generators remaining in operation.

Connected to each of gasifiers 10, 11, 12, and 13 are pneumatic switches 64, 65, 70, and 71, respectively. Each of these switches is connected to its respective gasifier through lines 72, 73, 74, and 75, respectively, which lead into one of the air cushion chambers of the gasifier. With stoppage of a gasifier, the pressure within the air cushions decreases and the pneumatic switch connected to the cushion chamber responds to this decrease in pressure.

For purposes of description, it will be assumed that during the operation of the powerplant, the gasifier 10 ceases operation. Upon cessation of operation of the gasifier 10, the pressure in the air cushions will decrease and upon decrease of the pressure, pneumatic switch 64 will operate. Operation of the switch 64 closes electrical switches 76, 77, and 78. With closing of electrical switch 76, electric current passes from line 75, a source of electrical current, through line 80 and then through line 81 to relay 82. The flow of current to the relay 82 energizes the relay which opens switch 83 and opening of switch 83 serves to de-energize relay 84 which has been receiving current from line 85 connected to line 75. De-energizing of relay 84 opens switch 90 and closes switch 91.

With opening of switch 90 as a result of the stoppage of gasifier 10, current which has been previously passing through this switch from line 75 through line 85 is discontinued. This current previously passing through switch 90 passed through line 91', closed switch 92, line 93, closed switch 94, line 95, closed switch 100, and line 101 to relay 102. However, with opening of the switch 90 and discontinuing of this current, the relay 102 is de-energized. De-energizing of the relay 102 closes switch 103 and opens switch 104. With opening of switch 104, current passing from line 75 through line 105 and from the switch 104 through line 110 to solenoid motor valve 111 is discontinued. With discontinuance of this current, the solenoid motor valve 111 is de-energized and de-energizing of this valve operates air valve 112. Air under pressure enters air valve 112 through line 113 and imposes the pressure of this air through line 114 upon pneumatic motor valve 115. However, with operation of the air valve 112, the pressure of the air entering through line 113 is vented through line 116, which venting, in turn, releases the pressure on the pneumatic motor valve 115. With release of pressure on the valve, the valve operates to close valve 120.

Valve 120 is connected through line 121, valve 122, header 123, and line 124 to pump 125. Pump 125 provides a pressure of a control oil through the line 124 to the header 123. Also connected to header 123 are valves 130, 131, and 132. Each of these valves is a pressure control valve and serves to provide therefrom a predetermined output pressure of the control oil. The predetermined output pressure of the control oil from each of these valves is different with the valve 122 providing the minimum predetermined pressure of the control oil and each of valves 130, 131, and 132 providing a higher predetermined output pressure of the control oil. Valve 130 is connected to the header through line 133 provided with normally closed valve 134. The valves 131 and 132 are also connected to the header through lines 135 and 136, respectively, provided with normally closed valves 137 and 138. Valve 120 is connected through line 139 to header 140. Valves 134 and 137 are also connected to this header through lines 141 and 142, respectively. Valve 138 is also connected to this header. Header 140 is connected to fuel rack regulator 143'. The fuel rack regulator is responsive to the pressure of the control oil in the header 140 and with increase in this pressure serves to control the output of fuel pump 18 to increase the output of the fuel pump to the gasifiers proportionately to the pressure imposed upon the fuel rack regulator.

The valves 122, 130, 131, and 132 serve to supply the fuel to the plant in the amount required by the number of gasifiers in operation. The valve 122 is set to provide an output pressure of the control oil on fuel rack regulator 143' such that the pump will supply sufficient fuel to maintain the desired gas output of the plant with all the gasifiers in operation. The valve 130 is set to provide an output pressure of the control oil on the fuel rack regulator such that the pump will supply sufficient fuel to maintain the desired gas output of the plant with only three gasifiers in operation. Similarly, valves 131 and 132 are set to provide output pressures of the control oil on the fuel rack regulator such that the pump will supply sufficient fuel to maintain the gas output of the plant with only two, or only one, respectively, of the gasifiers in operation. Thus, with closing of valve 120 as a result of the gasifier 10 having discontinued operation, the rate at which the fuel is supplied to the gasifiers is no longer that at which the fuel had been supplied to the header 19 prior to discontinuance of the operation of the gasifier 10.

As mentioned, simultaneously with the closing of switch 76, switch 77 is closed. With closing of switch 77, electrical current from line 75 passes through line 80 through the switch 77 to line 143 and the current passes through line 143 to solenoid motor valve 144, actuating this valve. Actuating of the valve 144 activates air valve 145. Air valve 145 is provided with air entering through line 146. This air is under pressure and the pressure of this air is supplied through the air valve to line 147 and imposed through the line 147 to pneumatic valve 148. With operation of the relay 144, the air from line 146 is vented from valve 145 through line 151 and the pressure on line 147 is released. With release of the pressure upon line 147, valve 28 closes. This valve is connected through line 153 to fuel injector 20 on gasifier 10. Valve 28 is connected to header 19 through line 24 and, with closing of this valve, the fuel provided by pump 125 to header 19 is no longer able to pass into the gasifier 10. Thus, with discontinuance of operation of the gasifier, the supply of fuel through header 19 to the gasifier is discontinued.

Switch 78, as previously mentioned, closes simultaneously with switches 76 and 77. With closing of switch 78, current from the line 75 passes through line 155 through the switch 78 to the line 160 leading to motor valve 161 to operate this valve. With operation of motor valve 161, valve 40 is operated through line 162. With operation of the valve 40, the valve closes line 44 between the exhaust gas receiver 32 and the header 52. Simultaneously, the line 54 is opened to the exhaust header 62 and thus the gasifier is now opened to the exhaust stack 63.

Simultaneously with closing of valve 120, valve 134 opens. Upon closing of switch 91, current from the line 75 passes through line 85 through switch 91 to line 163. This current passes through switch 164, line 165, switch 170, line 171, switch 172, and line 173 to relay 174. Passage of the current to the relay 174 energizes the relay to open switch 175 and close switch 180. With closing of switch 180, current from the line 75 passes through line 181 through the switch 180 and then through line 182 to solenoid motor valve 183. Operation of this valve actuates air valve 184. Air valve 184 is provided with a source of air under pressure through line 185 and this pressure is imposed through line 190 upon pneumatic motor valve 191. With actuation of the air valve 184, the air pressure from line 185 is vented through line 192, releasing the pressure upon the pneumatic motor valve 191 through line 190. With operation of the pneumatic motor valve 191, valve 134 is opened. Upon the opening of valve 134, the pressure of the control oil in line 123 and controlled by the pressure regulating valve 130 is imposed upon the header 140. Thus, the pressure of the control oil on the fuel rack regulator is now that as controlled by the valve 130, i.e., the pressure required to operate the pump to provide fuel at a rate required by the three gasifiers remaining in operation. Further, simultaneous opening of valve 134 with closing of valve 120 maintains continuity of operation of the plant.

Regardless of which of gasifiers 10, 11, 12, or 13 discontinued operation, the valve 120 would be closed and the valve 134 opened. Further, the supply of fuel to that gasifier would be discontinued. Additionally, the exhaust gas receiver of that gasifier would be disconnected from the header 52 and connected to the header 62.

The method and system of the invention also provides for maintenance of the desired output from the plant upon discontinuance of operation of one or more of the gasifiers still operating. Let it be assumed that gasifier 11 discontinues operation after gasifier 10 has discontinued operation, or discontinues operation simultaneously with gasifier 10. With discontinuance of operation of the gasifier 11, the fuel supply to this gasifier is discontinued, the exhaust gas receiver is disconnected from the header 52 and is connected to the header 62, and the rate of fuel supplied to the remaining two gasifiers 12 and 13 is increased so that these gasifiers will be able to provide the desired output from the plant.

With stoppage of gasifier 11, the decrease in pressure in the cushion chamber is transmitted through line 73 to pneumatic switch 65. Operation of the switch 65 closes switches 194, 195, and 196. With closing of switch 194, current from the line 75 passes through line 200 to line 201 and actuates relay 202. Actuation of the relay opens switch 203, which de-energizes relay 204 supplied with current from the line 75 through line 205. Actuation of the relay 204 opens switches 92 and 164 and closes switches 205' and 210. With opening of switch 164, the current cannot pass from line 75 through line 85, switch 91 (which is closed, or would be closed, as a result of discontinuance of operation of gasifier 10), line 163, switch 164, line 165, switch 170, line 171, switch 172, and line 173 to relay 174 and the relay is de-energized. With de-energization of the relay 174, switch 175 is closed and switch 180 is opened. Upon opening of switch 180, solenoid motor valve 183 is de-energized and this in turn closes air valve 184 to discontinue venting of the air pressure in line 185 through line 192. This in turn operates pneumatic motor valve 191 to close valve 134. With closing of valve 134, the pressure of control oil regulated by the control valve 130 to the fuel rack regulator 143' is discontinued. Thus, the rate of supply of the fuel to the gasifiers as required for operation of three gasifiers is discontinued.

With closing of switch 195, current from the line 75 passes through the line 200 and the switch 195 to line 211, and from line 211 to the solenoid motor valve 212. Solenoid motor valve 212, upon passage of the current thereto, actuates air valve 213. This valve is provided with air under pressure from line 214 and the pressure of the air in this line is transmitted through line 215 to pneumatic motor valve 220. With actuation of the air valve 213, the pressure of the air in line 214 is vented to atmosphere through line 221 with decrease of pressure in line 215. This latter decrease in pressure operates pneumatic motor valve 220 to close valve 29 which discontinues the supply of fuel from header 19 to the fuel injector 21 of gasifier 11.

Upon closing of switch 196, current from the line 75 passes through line 222 through the switch 196 and then through line 223 to motor valve 224. Supply of the current to the motor valve actuates the valve and actuation of the valve operates the valve 41 through line 225 to disconnect the gas receiver from the header 52 and connect it to the header 62.

Switch 210, closing simultaneously with switch 205', permits flow of current from line 75 through line 85, switch 91, line 163, line 230, switch 210, line 231, switch 232, line 233, switch 234, line 235, to relay 240. Supply of current to relay 240 actuates the relay to open switch 241 and close switch 242. With closing of the switch 242, current passes from the line 75 through line 243, the switch 242, line 244, to solenoid motor valve 245 to actuate the valve. Actuation of the latter valve operates air valve 250 which is supplied by air under pressure through line 251. The pressure of the air in line 251 is transmitted through line 252 to pneumatic motor valve 253. Actuation of the air valve 250 vents the pressure of the air from line 251 to atmosphere through line 254, thereby releasing the pressure on line 252 and actuating pneumatic motor valve 253. With actuation of this valve, valve 137 is opened. With opening of valve 137, the pressure of the control oil in line 123 is imposed through control valve 131 upon the header 140. Thus, the pressure of the control oil as controlled by the valve 131 is imposed upon the fuel rack regulator and the fuel pump responds to provide the fuel at the rate required by the two gasifiers remaining in operation to maintain the gas output of the plant.

Assume now that gasifier 12 also discontinues operation. Upon discontinuance of the operation of this gasifier, the decrease in pressure within the cushion chamber is transmitted through line 74 to pressure switch 70 which operates to close switches 255, 260, and 261. With closing of switch 255, current from the line 75 passes through line 262, the switch 255, and then line 263 to relay 264. Relay 264, upon passage of the current thereto, opens switch 265 which discontinues the supply of current from source 75 through line 270 to relay 271. De-energization of the relay 271 opens switches 94, 170, and 232 and closes switches 272 and 273. With opening of switch 232, current can no longer pass from the line 75 through line 85, switch 91, line 163, line 230, switch 210, line 231, switch 232, line 233, switch 234, and line 235 to the relay 240. The relay 240 is thus de-energized with the result that switch 242 opens and current is no longer supplied to the solenoid motor valve 245. With discontinuance of supply of current to the solenoid motor valve 245, the air valve 250 is deactuated to discontinue the venting of the pressure from line 251 to atmosphere through line 254 and penumatic motor valve 253 operates to close valve 137. With closing of valve 137, the pressure of the control oil imposed by the pump 125 to header 140 through valve 131 is discontinued. Thus, the supply of fuel required for the operation of two gasifiers is discontinued.

With closing of switch 260, current from the line 75 passes through the line 262 through the switch 260 and then through the line 275 to the solenoid motor valve 280. Current passing to the solenoid motor valve 280 operates air valve 281. The valve 281 is provided with air under pressure through line 282 and the pressure of this air is imposed through line 283 to pneumatic motor valve 284. With operation of the solenoid motor valve 280, the pressure from line 282 is vented to atmosphere through line 285 which relieves the pressure in line 283 and this in turn operates pneumatic motor valve 284 to close valve 30. With closing of valve 30, the fuel supply to the gasifier 12 through the injector 22 by way of line 26 from header 19 is discontinued.

Upon closing of switch 261, the current from the line 75 passing through line 286 to the switch passes through line 290 to operate motor valve 291. Operation of the motor valve 291 actuates valve 42 through line 292 to disconnect the exhaust gas receiver 34 from the header 52 and connect it to the header 62 leading to the stack 63.

Switch 241 closing, current can flow from the line 75 through closed switch 103, line 292, switch 175, line 293, switch 241, and line 294 to relay 295 to actuate the relay to close switch 300 and supply current through line 301 to solenoid motor valve 302 and actuate this valve. Actuation of the valve 302 operates air valve 303 which is provided with air under pressure from line 304. This pressure is imposed through line 305 upon penumatic motor valve 310 and operation of the valve 303 vents the pressure from line 304 to atmosphere through line 311. This in turn actuates the pneumatic motor valve 310 to open valve 138. With opening of valve 138, the pressure of the control oil from the header 123 as controlled by control valve 132 is imposed upon the header 140. This in turn controls the fuel rack regulator to increase the output of the fuel pump to provide fuel to the gasifiers still operating to provide the desired gas output of the plant.

In the description heretofore, gasifier 10 first discontinued operation and thereafter gasifier 11 and subsequently gasifier 12 also discontinued operation. The same sequence of operations would be effected regardless of which of the gasifiers first discontinued operation and which secondly discontinued operation and which thirdly discontinued operation. For example, assume that gasifier 13 was the first to discontinue operation. Upon discontinuance of operation, the pressure would be decreased within the cushion chamber and the decrease in pressure would be transmitted through line 75 to the pneumatic switch 71. This would close switches 313, 314, and 315. With closing of switch 313, current from the line 75 passes through line 320, through the switch 313 to line 321 and operates relay 322. Operation of the relay opens switch 323 which de-energizes relay 324 by discontinuance of the supply of current through the line 325 from the line 75. Operation of the relay 324 opens switch 100. Current thus could not be supplied from the line 75, line 85, switch 90, line 91', switch 92, line 93, switch 94, line 95, switch 100, and line 101 to the relay 102. Operation of the relay 102 closes the valve 120 as previously described whereby the supply of fuel to the fuel rack regulator as controlled by control switch 122 would be discontinued. Further, with closing of switch 314, current from the line 75 passes through line 320, the switch 314, and line 330 to solenoid motor valve 331. This valve, upon supply of current thereto, actuates air valve 332. This valve is supplied with air under pressure through line 333 and the pressure of this air is imposed upon line 334 leading to pnuematic motor valve 335. Actuation of the valve 332 vents the pressure from line 333 through line 340 to atmosphere, thereby relieving the pressure in line 334 and actuating the pneumatic motor valve 335. Actuation of the valve 335 closes valve 31 whereby the supply of fuel to the gasifier 13 through injector 23 from line 27 connected to header 19 is discontinued. Also, with closing of switch 315, current from the line 75 passes through the line 341, the switch 315, and line 342 leading to motor valve 343. The current passing to the valve 343 actuates the valve to disconnect through line 344 the exhaust gas receiver 35 from the header 52 and connect it to the header 62.

Various modifications of the method and system described will be obvious to those skilled in the art. For example, means may be provided to shut off all the gasifiers remaining in operation when the gasifiers remaining in operation are incapable of providing, even with an increased rate of supply of fuel, the desired output of the plant. Further, where a switch, relay, or valve is illustrated, a plurality of switches, relays, or valves may be substituted, particularly where such substitute switches, relays, or valves, even though increasing the number of parts employed, are commercially readily available.

Having thus described our invention, it will be understood that such description has been given by way of illustration and example and not by way of limitation, reference for the latter purpose being had to the appended claims.

We claim:
1. A system for restoring the power output of a powerplant producing a heated gas under pressure, and operating with a plurality of individual gasifiers, upon stoppage of at least one of said gasifiers, each of said gasifiers being supplied with a fuel and increasing in rate of power output with increase in rate of fuel supply thereto, comprising means for developing a signal upon stoppage of one of said gasifiers including a switch operating in response to a drop in pressure within said gasifier upon stoppage thereof and means responsive to said signal for increasing the rate of fuel supply to said gasifiers still operating to increase their power output including a fuel pump whose rate of output is controlled by the number of gasifiers still operating.

2. The system of claim 1 wherein said gasifiers are free piston engines and are supplied with a liquid fuel.

3. The system of claim 1 wherein said means responsive to said signal is means to increase the rate of fuel supply to said gasifiers still operating to increase their power output to that of the total number of said gasifiers operating prior to stoppage of said one of said gasifiers.

4. The system of claim 1 including means for discontinuing supply of fuel to said gasifier upon stoppage of said gasifier and means for preventing backflow of gas to said gasifier upon stoppage of said gasifier from said gasifiers still operating.

5. The system of claim 1 wherein said switch operating in response to a drop in pressure within said gasifier upon stoppage thereof operates valve means for increasing the rate of output of said fuel pump.

6. The system of claim 1 wherein said means for increasing the rate of fuel supply to the remainder of said gasifiers still operating includes a plurality of pressure control valves, each of said valves providing a different output pressure of a control oil supplied thereto controlling the rate of output of said fuel pump, and including means for operating said valves in response to the number of said gasifiers still operating.

7. The system of claim 1 wherein said heated gas under pressure is supplied to an expander turbine and said expander turbine operates an air compressor.

8. The system of claim 1 wherein said switch operates an electrical switch to supply electrical current to relays which in turn operate solenoid motor valves to operate pneumatic motor valves to increase the rate of output from said fuel pump.

9. A plant to produce compressed air, comprising:
a plurality of free piston engines,
an exhaust gas receiver for each of said free piston engines,
a control valve on each of said exhaust gas receivers,
a header to which each of said control valves is connected,
an exhaust header to which each of said control valves is connected,
an expander turbine connected to said header,
an air compressor connected to and operable by said expander turbine,
each of said free piston engines having a fuel injector provided with a valve,
fuel pump means to supply liquid fuel through said fuel injectors to said free piston engines,
a fuel rack regulator to operate in response to the pressure of a control oil to control the rate of output of said liquid fuel from said fuel pump means,
a plurality of valves to control the pressure of said control oil to said fuel rack regulator, each of said valves having a different output pressure of said control oil, and
a pressure switch connected to a cushion chamber of each of said free piston engines,
each of said pressure switches connected through electrical switching means, relays, a solenoid motor valve, an air valve, and a pneumatic motor valve to said valves to control the pressure of said control oil to said fuel rack regulator,
each of said pressure switches connected through electrical switching means, a solenoid motor valve, an air valve, and a pneumatic motor valve to said valve of said fuel injector of said respective free piston engine, and
each of said switching means connected through a motor valve to close said control valve on said exhaust receiver for said respective free piston engine.

References Cited
UNITED STATES PATENTS

| | | | |
|---|---|---|---|
| 2,625,789 | 1/1953 | Starkey | 60—39.16 |
| 2,865,176 | 12/1958 | Skellern | 60—39.16 |
| 3,046,727 | 7/1962 | Horgen | 60—13 |
| 3,068,647 | 12/1962 | Santamaria | 60—39.09 |
| 3,258,914 | 7/1966 | Bishop | 60—39.15 |

MARTIN P. SCHWADRON, *Primary Examiner.*
DOUGLAS HART, *Assistant Examiner.*